though the regulating device 6 may be of any suitable type it is preferably a static type regulator such as the multistage transistor amplifier and regulator described and claimed in copending patent application Serial No. 105,935 filed April 27, 1961 which is assigned to the assignee of the present invention. Since the details per se of this regulating circuit are not important to the present invention and since any other suitable regulating circuit may be employed in its place the regulating circuit 6 is illustrated conventionally in the drawing. It is sufficient to understand that it is a very fast acting regulator and controls the voltage $Vtr$ across transistor Q1 so as to maintain the output voltage $Vout$ approximately constant at a preset level.

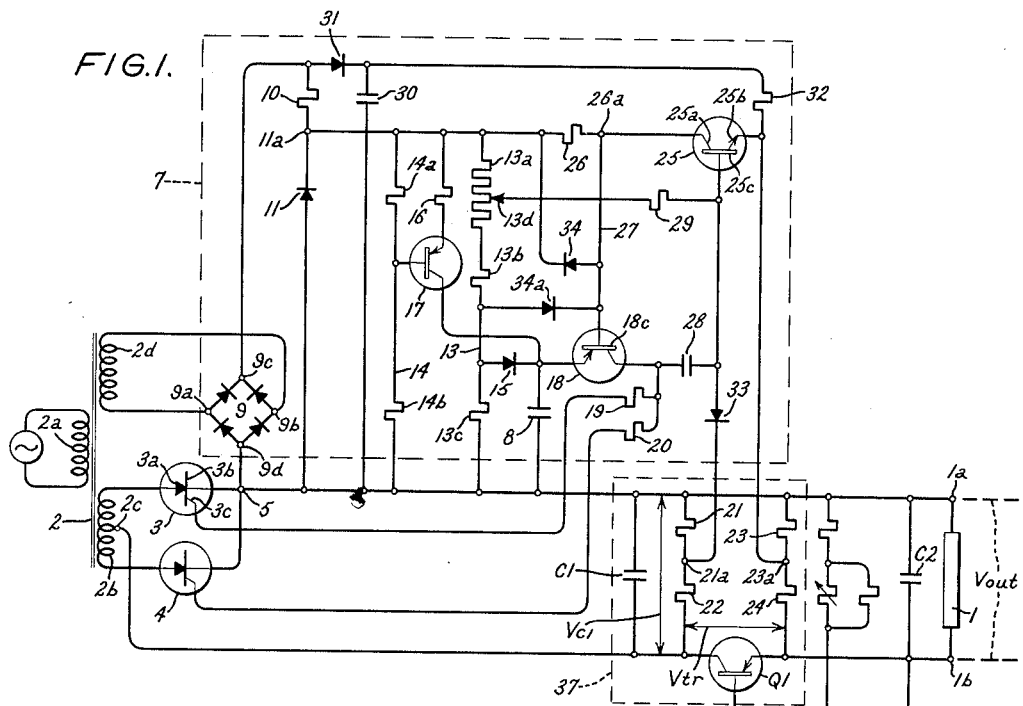

3,213,351
FIRING PULSE GENERATING CIRCUIT FOR SOLID STATE CONTROLLED RECTIFIERS
Charles S. Walker, Moylan, Pa., assignor to General Electric Company, a corporation of New York
Filed Mar. 26, 1962, Ser. No. 182,584
9 Claims. (Cl. 321—18)

This invention relates to solid state controlled rectifiers and more particularly firing pulse generating circuits therefor, and it has for an object provision of a simple, reliable and inexpensive pulse generating circuit for controlled rectifiers of this character.

Another object of the invention is the provision of a firing circuit for solid state controlled rectifiers in which the firing angle, i.e., the point in the half cycle of alternating supply voltage at which the firing pulse is delivered is linearly related to the magnitude of a control signal.

Briefly stated, in carrying the invention into effect in one form thereof, a capacitor, initially discharged in each half cycle of the alternating voltage, is provided for storing energy that is to be converted into firing pulses. A rectifier supplied from an alternating voltage that is synchronously related to the alternating voltage supply for the solid state controlled rectifier and a constant current network supplied therefrom furnishes charging current for the capacitor. A discharge circuit for the capacitor includes the emitter and collector electrodes of a transistor and the gate electrode of the controlled rectifier. A control signal is supplied to the base electrode of the transistor to control it and cause the capacitor to supply a firing pulse to the gate electrode at a point in each cycle of the alternating voltage that is linearly related to the magnitude of the control signal.

For a better and more complete understanding of the invention reference should now be had to the following specification and to the accompanying drawings in which:

FIG. 1 is a simple diagrammatical sketch of an embodiment of the invention,

FIG. 2 is a chart of characteristic curves that facilitates an understanding of its operation, and FIG. 3 is a simple diagrammatic skitch of a modification.

Referring now to the drawing and particularly to FIG. 1 thereof, a load 1, illustrated as a resistive load device, is supplied from a suitable source of alternating voltage such as the secondary winding $2b$ of a supply transformer 2 to which it is connected through a pair of solid state controlled rectifiers 3 and 4; preferably these are silicon controlled rectifiers. The silicon controlled rectifier 3 is a PNPN semiconductor device having an anode $3a$, a cathode $3b$ and a gate control element $3c$. Conduction through the controlled rectifier from anode to cathode is initiated by application to the gate circuit of a small control signal in the form of a firing pulse which causes avalanche breakdown of the center rectifying junction. This breakdown occurs within 1–10 microseconds. After breakdown the control gate element normally loses control over conduction through the rectifier so that current flow through it continues until the voltage across its anode and cathode is reduced to zero. The controlled rectifier 4 may be assumed to be identical with controlled rectifier 3. These two controlled rectifiers are connected in a diametric configuration to the center tapped secondary winding $2b$ of transformer 2 so that the common cathode terminal 5 becomes the positive output terminal of the diametric configuration and the center tap $2c$ becomes the negative terminal. A capacitor C1 is connected across the positive and negative terminals.

By varying the firing angle of controlled rectifiers 3 and 4 the voltage across capacitor C1 may be varied through a wide range. For example, in the case of a ratio of .1 between the impedance of transformer 2 and the output resistance, for a firing angle retardation of 1.4 radians, the voltage across capacitor C1 will be 70% of the peak line-to-center tap voltage of the secondary winding $2b$ of transformer 2. If the firing angle retardation is increased to 2.5 radians the voltage $Vc1$ across capacitor C1 will drop to 22% of the peak line-to-center tap voltage. Thus by varying the firing angle the voltage across capacitor C1 may be regulated for the purpose of minimizing the effects of line voltage and load variations on the voltage level of capacitor C1.

Across the output terminals $1a$ and $1b$ is connected a capacitor C2 and in the negative lead in series relationship between the output terminal $1b$ and the negative supply terminal $2c$ is connected the main current conducting path including the main current conducting electrodes of a power transistor Q1. By means of a high-speed regulator 6 responsive to voltage across output terminals $1a$ and $1b$ the base current of the series connected power transistor Q1 is controlled to regulate and to maintain the output voltage substantially constant at a predetermined value. Although the regulating device 6 may be of any suitable type it is preferably a static type regulator such as the multistage transistor amplifier and regulator described and claimed in copending patent application Serial No. 105,935 filed April 27, 1961 which is assigned to the assignee of the present invention. Since the details per se of this regulating circuit are not important to the present invention and since any other suitable regulating circuit may be employed in its place the regulating circuit 6 is illustrated conventionally in the drawing. It is sufficient to understand that it is a very fast acting regulator and controls the voltage $Vtr$ across transistor Q1 so as to maintain the output voltage $Vout$ approximately constant at a preset level.

In order to limit power dissipation in the series power transistor Q1, means in the form of a firing circuit 7 controlled by a terminal electrical characteristic of transistor Q1 is provided for controlling the firing of the controlled rectifiers 3 and 4. In the embodiment illustrated in FIG. 1 this firing circuit is controlled by the voltage $Vtr$ across the main current conducting electrodes of transistor Q1. For any particular setting or value of $Vout$, regulating the voltage $Vtr$ implies regulating $Vc1$ since $Vc1=Vout+Vtr$ and $Vout$ is held sensibly constant by the regulating circuit 6.

For the purpose of supplying firing pulses of current to the gate electrodes of the controlled rectifiers 3 and 4 a capacitor 8 together with charging and discharge circuits therefor is provided. Charging current is obtained from a source of periodically varying voltage that is synchronously related to the alternating voltage that is supplied to the controlled rectifiers 3 and 4. To produce this periodically varying voltage a full wave bridge configuration rectifier 9 is provided. Its input terminals $9a$ and $9b$ are connected to be supplied from an additional secondary winding $2d$ mounted on the core of supply transformer 2. It will be understood of course that the bridge 9 might be supplied from a separate transformer supplied from the same source as that from which the transformer 2 is supplied. Connected in series relationship with each other across the output terminals $9c$ and $9d$ are a resistor 10 and a Zener diode device 11. A rectified sine wave voltage such as represented by the curve 12 in FIG. 2 (location A) appears across the output terminals of rectifier 9 and a clipped periodically varying voltage, such as represented by curve $12a$, appears at the terminals of the Zener diode 11. For the purpose of providing a relatively high initial charging rate and a relatively low final charging rate of capacitor 8, voltage dividers 13 and 14 and associated circuit elements are provided. Divider 13 comprises potentiometer 13a and resistors 13b and 13c all connected in series relationship across Zener diode 11; divider 14 comprises resistors 14a and 14b connected in series relationship across the Zener diode. A rectifying device such as a semiconductor diode 15 is connected between an intermediate point on voltage divider 13 and the positive terminal of the capacitor 8. Associated with the divider 14 are a resistor 16 and a transistor 17 connected in series relationship with each other between the positive terminal 11a of the Zener diode and the positive terminal of capacitor 8. The base electrode of transistor 17 is connected to an intermediate point on voltage divider 14; as shown, it is connected to the common terminal of resistors 14a and 14b. Voltage divider 14, resistor 16 and transistor 17 constitute a constant current network, i.e., substantially constant current will be maintained in the emitter-collector circuit of the transistor.

The discharge circuit of capacitor 8 comprises the main conducting path of a transistor 18 and two parallel branch circuit resistors 19 and 20 connected between one of the main current conducting electrodes of transistor 18 and the gate electrodes of controlled rectifiers 3 and 4.

For controlling the transistor 18 to initiate discharge of the capacitor 8 in response to departure of the voltage across series power transistor Q1 from a predetermined value, means are provided for sensing such departure and a control circuit responsive to such means is provided for controlling the transistor 18.

For sensing departures of the voltage $V_{tr}$ of transistor Q1, a bridge network is provided which is illustrated as comprising resistors 21, 22, 23 and 24. Resistors 21 and 22 which constitute two of the arms of the bridge network are connected in series relationship between the positive terminal 5 of the diametric configuration and one of the main current conducting electrodes of transistor Q1. Similarly the resistors 23 and 24 constitute the other two arms of the bridge network and are connected in series relationship between the positive terminal 5 and the other main current conducting electrode of transistor Q1. For detecting unbalance of the bridge network suitable electric valve means is connected to be responsive to the voltage across the output terminals 21a and 23a. This electric valve means is preferably of the semiconductor type such as the transistor 25 having collector, emitter and base electrodes 25a, 25b and 25c. The input conducting path of transistor 25 including the base electrode 25c and one of the main current conducting electrodes is connected across the output terminals 21a and 23a of the bridge network and the main current conducting path through the emitter and collector electrodes is connected in series relationship with a voltage dropping device, such as resistor 26, to the positive terminal of the Zener diode 11. In order that the voltage drop across resistor 26 may be utilized in the control of discharge circuit transistor 18, the base electrode 18c of the latter is connected by means of a conductor connection 27 to a point on the resistor 26 such as its negative terminal 26a, as illustrated in FIG. 1.

A regenerative connection is provided between the main conducting path of discharge circuit transistor 18 and the base electrode 25c of the control circuit transistor 25. A capacitor 28 is included in this regenerative connection. The regenerative action produced by this connection results in an abrupt discharge of the capacitor 8 and consequently in the supply to the controlled rectifier gate electrodes of firing pulses having correspondingly steep wave fronts.

Included in circuit between the base 25c and the slider 13d on potentiometer section 13a of the voltage divider 13 is a resistor 29. The level of the voltage that is maintained across the power transistor Q1 is determined by the value of this resistor 29 and the position of the slider 13d on potentiometer 13a and this level may be adjusted to any desired value within a predetermined useful range by adjusting the position of the slider.

Across the output of the full wave rectifier 9 is connected a capacitor 30 that provides a direct voltage that is a function of line voltage. A blocking rectifier 31, illustrated as a semiconductor diode, is included in circuit between the positive terminal of capacitor 30 and the positive terminal of rectifier 9.

Through a resistor 32, compensation for line voltage variations is introduced to the control circuit transistor 25. This compensation further reduces the static variation of the voltage $V_{tr}$ across the power transistor Q1 that results from variations in line voltage changes. Temperature compensation of transistor 25 is provided by means of a semiconductor diode 33 included in the connection between the base electrode 25c and the terminal 21a of the bridge configuration network. Synchronization of the voltage across capacitor 8 with the rectified output voltage of full wave rectifier 9 is provided by means of a diode rectifier 34 that is connected between the base electrode 18c of the discharge circuit transistor 18 and a point on the voltage divider 13. As shown it is connected to the positive terminal of the voltage divider.

In the completely deenergized condition of the regulated supply, voltage $V_{tr}$ and $V_{C1}$ are both zero. Upon reestablishment of energization, transistor 25 tends to be fully turned on by the current through resistor 29 in the base to emitter circuit. This in turn, tends to turn on transistor 18 in the discharge circuit and thereby prevent capacitor 8 from charging. For the purpose of insuring initial charging of capacitor 8 when starting up from a completely deenergized condition a diode 34a is connected between the base 18c of the transistor and the point on the voltage divider to which the capacitor 8 is connected through the charging diode 15. This maintains the transistor 18 in the non-conducting state until the capacitor becomes charged to a voltage greater than the voltage across section 13c of the voltage divider and thus attains a value that is adequate to provide effective firing pulses to the gate electrodes of controlled rectifiers 3 and 4.

With the above understanding of the elements and their organization, the operation of the power supply and its firing circuit will readily be understood from the following detailed description.

It is assumed that the slider 13d is adjusted to a position on resistor 13a corresponding to the level of the voltage $V_{tr}$ that it is desired to maintain across series power transistor Q1. In order to minimize dissipation in transistor Q1, $V_{tr}$ will ordinarily be relatively low in comparison with the voltage $V_{c1}$ across capacitor C1. For example, if voltage $V_{c1}$ is 28 volts, $V_{tr}$ may appropriately be 3 or 4 volts. At these values the bridge network is assumed to be just enough unbalanced to cause firing pulses to be delivered to the gates of the controlled rectifiers 3 and 4 at the firing angle retardation that will maintain the desired relationship of voltages $V_{out}$, $V_{tr}$ and $V_{c1}$.

At the beginning, i.e., at zero electrical degrees, of each half cycle of the rectified voltage of the full wave rectifier 9, the voltage across capacitor 8 is approximately zero. As the voltage across the Zener diode 11 rises from zero in accordance with curve 12 in FIG. 2 (location A), current will flow from the voltage divider 13 through diode rectifier 15 to charge the capacitor 8. Charging current will also flow through resistor 16 and transistor 17 of the constant current network, and the voltage across capacitor 8 will rise at a relatively rapid initial rate as is illustrated graphically by the portion of curve 35 between zero and point 35a. When the voltage of capacitor 8 attains a value equal to the voltage drop across resistor section 13c of the voltage divider, rectifier 15 will cease to conduct. However, the constant current network will continue to supply charging current to the capacitor through the transistor 17 and the capacitor voltage will continue to rise, but at a lower and linear rate as represented graphically by the reduced slope of the portion of the curve 35 at the right of point 35a. Since the charging current supplied to the capacitor is maintained constant, the rise of capacitor voltage is linear with respect to time. For any unbalance of the bridge network, current flows in the main conducting path of transistor 25 and this current produces a voltage drop across resistor 26. As the rising voltage of capacitor 8 becomes greater than the voltage at terminal 26a of resistor 26 with respect to terminal 5, discharge circuit transistor 18 begins to conduct and the voltage drops across gate circuit resistors 19 and 20 will increase. This produces current through capacitor 28 which increases the base current of control circuit transistor 25. The increased base current produces an increased collector current which in turn increases the voltage drop across resistor 26. As a result, the base current of discharge circuit transistor 18 is increased thereby resulting in a regenerative action. This regeneration produces an abrupt turnon of transistor 18 and in the supply of correspondingly abrupt front firing current pulses to the gate electrodes of controlled rectifiers 3 and 4. The discharge of the capacitor is represented by the steeply descending portion of curve 35 in FIG. 2(C) between points 35b and 35c, and the voltage pulses supplied across resistors 19 and 20 in the gate electrode circuits of the controlled rectifiers are represented by curve 36 in FIG. 2(D). Owing to the brief duration of the firing current pulse which is of the order of a few, i.e., 10–15 microseconds, curve 36 appears as a vertical line. In response to these firing pulses the controlled rectifier whose anode at that instant is positive will be suddenly switched from the nonconducting state to the conducting state. It may be assumed that controlled rectifier 3 has positive anode voltage at this instant. Consequently it fires and supplies charging current to capacitor C1 as well as some current to the load 1.

At point 35c, the voltage of capacitor 8 has decreased to such a low value that regeneration ceases; consequently, transistor 18 ceases to conduct and charging current is again supplied to capacitor 8 so that its voltage again rises in accordance with the portion of curve 35 between points 35c and 35d. At point 35d transistor 18 again becomes conducting and again causes current pulses to be supplied to the gate electrodes of the controlled rectifiers. This will occur a number of times in each half cycle of the line voltage but the first pulse in the series is the one that fires the controlled rectifier. The remaining pulses generated in the same half cycle have no effect on the conduction by the controlled rectifier that was fired by the first pulse. As the voltage across the Zener diode 11 drops to zero at the end of the half cycle of line voltage, base current of transistor 18 flows through diode 34 thereby turning on transistor 18 and almost completely discharging capacitor 8.

The above described action is repeated in the next succeeding half cycle of line voltage but this time controlled rectifier 4 will be fired because in this half cycle its anode voltage is positive. The firing angle retardation will be the same for each half cycle since the same elements and components control the firing angle.

If the collector current of transistor 25 that is produced by the unbalance of the bridge network is increased, the firing pulse, i.e., the first pulse in each half cycle will occur sooner. The reason for this is that increasing collector current increases the voltage drop across resistor 26; consequently the voltage at terminal 26a becomes increasingly less positive and the voltage of capacitor 8 which increases linearly becomes equal to the voltage at terminal 26a earlier in the half cycle. Conversely, if the collector current of transistor 25 is decreased the firing pulse will occur later in the half cycle. Hence, the voltage V$tr$ across transistor Q1 which controls the collector current of transistor 25 will control the firing angle of the controlled rectifiers 3 and 4. Owing to the linear rise of the voltage of capacitor 8 in each half cycle the rela- tionship between the firing angle of the controlled rectifiers and the voltage V$tr$ will be essentially linear.

Positive departures of line voltage from the normal constant value are speedily corrected. Capacitor 30 provides a voltage that is directly related to the line voltage. Hence through resistor 32 compensation for line voltage variations is supplied to transistor 25. As a result, static variation of V$tr$ with line voltage changes is still further reduced. Since the time constant of the circuit in which capacitor 30 is included is short, the compensation is almost instantaneous and positive transient voltages across transistor Q1 are minimized.

Current limit is obtained by introducing an initial small amount of unbalance in the bridge network in such a manner as to increase the firing angle of the controlled rectifier as the voltage V$c1$ across the capacitor C1 decreases. When the supply is first turned on capacitor C1 is almost always discharged. Hence the firing angle is strongly retarded at turnon and this minimizes the production of undesirable transients in the supply line voltage.

Increasing the D.-C. gain tends toward closed loop instability. In applications in which increased D.-C. gain is desired, the tendency toward instability may be corrected by connecting in place of the sensing bridge network enclosed within the dotted rectangle of FIG. 1, the improved sensing bridge network of FIG. 3. Like parts and elements in FIGS. 1 and 3 have the same reference characters. As shown in FIG. 3, a resistor 38 is connected in series relationship with bridge arm resistor 22 to the negative supply conductor of the regulated supply. Between terminal 38a and the load terminal of power transistor Q1 is connected a parallel combination of which a resistor 39 and a capacitor 40 connected in series relationship constitutes one parallel branch and the diode 41 constitutes the other. A diode 42 is connected in parallel with resistor 38. Capacitor 40 in series with another parallel combination of which resistor 38 constitutes one branch and resistors 21 plus 22 constitute the other branch represents a relatively long time constant and thus provides an initial lag in the response to voltage V$tr$. In this connection capacitor C and its associated circuitry present a negligibly low impedance. By the addition of the relatively long time constant, the D.-C. value of the open loop gain may be increased within a desired useful range without resulting in instability.

The capacitor 40 in series with resistor 39 represents a relatively short time constant. For transients, however, the short time constant provides good dynamic response. Capacitor 40 (in the absence of resistor 39) tends to prevent instantaneous changes in V$tr$ from producing a signal in the base circuit of the control circuit transistor 25 in FIG. 1. Since the voltage across capacitor 40 cannot change instantaneously, a change in voltage V$tr$ appears instantaneously across resistor 38 and since V$out$ is maintained constant no current signal of the change in V$tr$ would be supplied to the base circuit of transistor 25. However, the addition of resistor 39 in series with capacitor 40 allows some part of a change in voltage V$tr$ to appear in one branch of the bridge network and thus to supply a signal current to the base circuit of transistor 25.

The net effect of the diode 42 after a turn off of the power supply is to effect discharge of capacitor 42 at a more rapid rate than would otherwise occur so as to provide a more rapid restoration of the output voltage V$out$ in response to a turn on immediately following a turnoff.

Although this invention has been described as incorporated in a specific embodiment, it will be understood that the invention is not limited thereto since alterations and modifications will readily suggest themselves to persons skilled in the art without departing from the true spirit of this invention or from the scope of the annexed claims.

What I claim as new and desire to secure by United States Letters Patent is:

1. In combination:
   (a) a solid state controlled rectifier having main current conducting electrodes and a gate electrode,
   (b) means for supplying alternating voltage to said main electrodes,
   (c) an initially discharged capacitor,
   (d) means for charging said capacitor comprising a rectifier provided with an output circuit and means for supplying to said rectifier a second alternating voltage synchronously related to said first alternating voltage,
   (e) a Zener diode included in said output circuit for clipping the rectified half cycles of said second alternating voltage,
   (f) connections from said diode to said capacitor for supplying said clipped voltage to charge said capacitor,
   (g) a transistor having emitter, collector and base electrodes,
   (h) a discharge circuit for said capacitor including said emitter and collector electrodes and said gate electrodes,
   (i) a control circuit including a voltage dropping device,
   (j) means for producing a signal voltage across said said voltage dropping device, and
   (k) a connection from said base electrode to a point on said voltage dropping device for causing said capacitor to deliver a pulse of current to said gate electrode to fire said controlled rectifier at a point in a half cycle of said alternating voltage that is dependent on the magnitude of said signal voltage.

2. The combination claimed in claim 1 wherein the charging connections from the Zener diode to the capacitor comprise a voltage divider connected in a circuit in parallel with said Zener diode, relatively high and relatively low voltage connections from different voltage points on said divider to said capacitor and a diode included in said low voltage connection to provide a relatively rapid initial charging rate and a relatively slow final rate.

3. The combination of claim 2 wherein a diode rectifier is connected between an intermediate point on said voltage divider to the base electrode of said transistor to maintain said transistor in the non-conducting state and thereby prevent discharge of said capacitor until the voltage of said capacitor attains a predetermined value that is adequate to provide effective firing pulses to the gate electrode of said controlled rectifier.

4. In combination:
   (a) a solid state controlled rectifier having main current conducting electrodes and a gate electrode,
   (b) means for supplying alternating voltage to said main electrodes,
   (c) an initially discharged capacitor,
   (d) means for charging said capacitor comprising a rectifier provided with an output circuit and means for supplying to said rectifier a second alternating voltage synchronously related to said first alternating voltage,
   (e) a Zener diode and a resistor included in series relationship in said output circuit for clipping the rectifier half cycles of said second alternating voltage,
   (f) a voltage divider connected in a circuit in parallel with said Zener diode,
   (g) means for effecting a relatively rapid initial charging rate of said capacitor and a linear relatively slow final charging rate comprising connections from points of different voltages on said divider to said capacitor including a diode in one of said connections and a constant current network in the other of said connections,
   (h) a transistor having emitter, collector and base electrodes,
   (i) a discharge circuit for said capacitor including said emitter and collector electrodes,
   (j) a control circuit including a voltage dropping device,
   (k) means for producing a signal voltage across said voltage dropping device, and
   (l) a connection from said base electrode to a point on said voltage dropping device for causing said capacitor to deliver a pulse of current to said gate electrode to fire said controlled rectifier at a point in a half cycle of said rectified voltage that is linearly related to the magnitude of said signal voltage.

5. In combination:
   (a) means for supplying an alternating voltage,
   (b) a load circuit supplied therefrom,
   (c) a solid state controlled rectifier having main current conducting electrodes included in said circuit and a gate electrode,
   (d) an initially discharged capacitor,
   (e) means for charging said capacitor comprising a rectifier connected to said capacitor and means for supplying to said rectifier a periodically varying voltage synchronously related to said alternating voltage,
   (f) a transistor having emitter, collector and base electrodes,
   (g) a discharge circuit for said capacitor including said emitter, said collector, said gate electrode and one of said main current conducting electrodes,
   (h) a control circuit having a connection to said base electrode,
   (i) a regulating device connected in said load circuit, and
   (j) means responsive to variations in the voltage across said regulating device for supplying a signal voltage to said base electrode to control said transistor to cause said capacitor to deliver a pulse of current to said gate electrode thereby to fire said controlled rectifier at a point in each cycle of the alternating voltage supplied thereto that is dependent on the magnitude of said signal voltage comprising a bridge network connected to the terminals of said regulating device and an electric valve device having main current conducting electrodes included in said control circuit and having a control electrode and one of its main electrodes included in a connection across opposite points of said bridge network.

6. The combination of claim 5 wherein said electric valve is a transistor having its main current conducting electrodes connected in said control circuit and having its base electrode and one of its main current conducting electrodes included in a connection across opposite terminals of said bridge network.

7. The combination of claim 5 wherein a temperature compensating solid state diode is included between one terminal of said bridge network and said control electrode in the connection across said bridge terminals.

8. The combination of claim 5 wherein a regenerative connection is provided between said base electrode of the transistor and said control electrode of the electric valve.

9. The combination of claim 5 wherein there is connected from an intermediate point of one branch of said bridge network to the common terminal of said regulating device and the other branch of said bridge network a parallel combination of a diode rectifier in one branch thereof and a series combination of a resistor and a capacitor connected in series in the other branch thereof.

References Cited by the Examiner

UNITED STATES PATENTS 2,393,884    1/46    Callender _____ 323—22 X
2,977,523    3/61    Cockrell _____ 323—22
3,070,739    12/62    Hansen _____ 321—47

LLOYD McCOLLUM, *Primary Examiner.*